April 2, 1957     J. M. MACY     2,787,484
SECTIONAL FISHING ROD
Filed Nov. 27, 1953
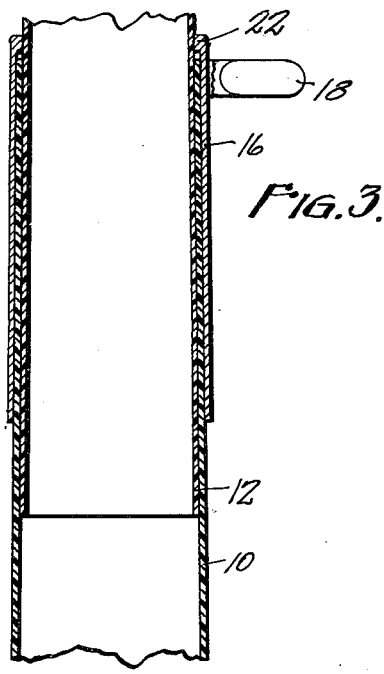
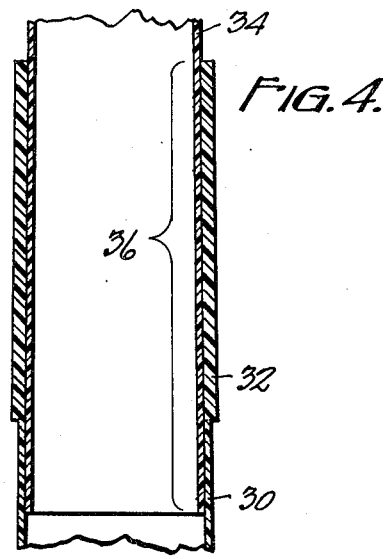
INVENTOR.
JOHN M. MACY.
BY Eugene C. Knoblock
ATTORNEY.

United States Patent Office 2,787,484
Patented Apr. 2, 1957

2,787,484

SECTIONAL FISHING ROD

John M. Macy, South Bend, Ind., assignor to South Bend Tackle Company, Inc., South Bend, Ind., a corporation of Indiana Application November 27, 1953, Serial No. 394,809

5 Claims. (Cl. 287—58)

This invention relates to sectional fishing rods, and more particularly to a sectional rod or pole of the type whose sections interfit telescopically so that the rod may be collapsed and may be self-contained when collapsed.

A number of efforts have been made in the past to produce a sectional fishing rod of the telescopic type, but these have generally been subject to certain functional limitations and deficiencies. The prior telescoping fishing rods were usually formed of metal, and, in cases where the rod was strong enough, its weight was usually considered to be excessive, and, in cases where a light weight metal sectional telescoping rod was produced, it was found not to be strong enough for use in fishing. Another characteristic of previous metal telescoping rods has been that the individual tubes making up the sections of the rod usually are of uniform cross-section, except as to the end portions thereof. In other words, metal tubes usually are formed of uniform cross-section throughout, and, in fabricating such tubes for use in sectional rods, fabrication was limited to the end portions only of the various tubes or rod sections in order to hold fabrication costs low enough to be feasible. In other words, the cost factor substantially precluded the use of tubes of metal formed of continuous circular cross-section and having a continuous uniform longitudinal taper. The limitation of the tapered portion to a small extent at the end of each rod section requires that a substantial angle of taper should occur at the tapered section, which angle was greater than that producing a wedge look of maximum efficiency, strength and effectiveness.

I have found that it is possible to avoid the defects and overcome the deficiencies of the prior constructions by fabricating a sectional fishing rod of the telescoping type from tubes formed of synthetic resin reinforced with fiber glass and having a uniform wall thickness and uniform taper throughout their length.

It is the primary object of this invention to provide a sectional extensible telescoping fishing rod or pole which is light in weight, which is strong, which does not require the use of securing means to hold it extended and, instead, relies wholly upon a frictional fit between the sections, which is readily collapsed, which is easily manufactured, and which is low in cost.

Other objects will be apparent from the following specification, it being understood that, although only a limited number of embodiments of the invention are illustrated in the drawing, my invention may take other forms and that it is the intention of the inventor that all forms which will fall within the scope of the appended claims will be considered to fall within the spirit of this invention.

In the drawing:

Fig. 1 is a view of the shaft in its extended position;

Fig. 2 is an enlarged sectional view of the shaft in its telescoped or collapsed condition;

Fig. 3 is an enlarged longitudinal sectional detail view taken at a joint and illustrating adjacent rod sections in extended interlocked condition; and Fig. 4 illustrates a modified embodiment of the invention and constitutes a longitudinal detail sectional view of the shaft or rod.

Referring to the drawing which illustrates one embodiment of the invention in Figs. 1 to 3 thereof, I have shown the invention embodied in a form using at least three sections to produce a complete fishing rod or pole. It will be understood that the number is selected for purposes of illustration only and is not intended to be limiting. The invention may be applied to rods formed of two sections or of more than three sections, depending upon the characteristics desired. As illustrated in Fig. 1, the three sections of the rod 10, 12 and 14 are each of different cross-sectional size and are of substantially the same length. Each of the sections 10, 12 and 14 preferably mounts a ferrule 16 which will be formed of metal. These ferrules may be plain or, as illustrated in Figs. 1 to 3, may mount line guides 18. The large diameter end of the largest section 10 preferably mounts a butt member 20 forming a closure and preferably being releasable from the rod section 10.

Each of the large diameter sections, such as the sections 10 and 12 into which smaller sections are adapted to fit, are tubular. In shape they are substantially uniformly tapered throughout their length or throughout selected portions thereof. The wall thickness of each may be substantially uniform throughout its length or may vary from point to point along its length. The tip section, such as the smallest diameter section, may also be a tube or it may be a solid bar.

Each of the rod sections or units, such as 10, 12 and 14, is made from synthetic material reinforced with fiber glass. In the fabrication of the tubular sections, glass cloth is preferred as a reinforcement, said glass cloth consisting of glass fibers which are woven to form a sheet. This glass cloth is rolled in multiple layers, and the adjacent layers and the surfaces of the tube at its inner and outer portions are coated with a synthetic resin which is preferably of the thermosetting character. Examples of synthetic resin which may be used for this purpose are phenolic resins, such as phenol formaldehyde. The materials best suited for the purpose are known in the trade as phenolic type laminating varnishes. It will be understood that these synthetic resins will be used in conjunction with solvent, such as denatured alcohol, and with plasticizers, such as polyvinylbutyrol or a plasticizer of the so-called nylon type. A sufficient quantity of the synthetic resin is applied to the fiber glass cloth to completely coat the glass fibers and to provide a substantially continuous and smooth surface at both the inner and outer faces of the tubular wall. These faces are preferably formed to precise dimensions by molding or other process, so that no machining or other surface finishing is required. By forming the surfaces to precise desired shape and dimension by molding, with avoidance of a machining operation sometimes required to secure accuracy of shape and dimension, it is possible to provide the various sections with smooth faces and to insure the retention of full strength of each section, and, furthermore, to maintain a manufacturing technique of maximum economy and minimum cost.

One example of rod embodying this invention is a rod construction of substantially 16 feet in length made from four sections having approximately the following dimensions and being characterized by a uniform taper of approximately .0032 inch per inch in length. This rod may have a tip section of minimum dimension, preferably of tubular stock having an inner diameter of .05 inch and an outer diameter of approximately .11 inch. At a point four inches from its large dimension, the tip preferably will have an inner dimension of .2036 inch and an outer dimension of approximately .2836 inch, assuming that the wall thickness at the last named end is slightly thicker than the wall thickness at the small dimension or tip end. The inner diameter at the large diameter end of the tip section will be in the order of .2164 inch and its outer diameter at that point will be in the order of .2964 inch. The next largest tubular section would be approximately .52 inches in length, as was the tip section, and its inner diameter at its end would be in the order of .2836 inch and its outer diameter at that point would be in the order of .3636 inch, with the outer diameter at a point approximately four inches from the small diameter tip being in the order of .3764 inch. At its opposite end this second section would have an inner diameter in the order of .4372 inch and an outer diameter in the order of .5172 inch at a point four inches from its large diameter end, and, at the very large diameter end, would have a dimension in the order of .45 inch inner diameter and an outer diameter in the order of .53 inch. The third largest section would have an inner diameter in the order of .5172 inch, and an outer diameter in the order of .5972 inch at its very tip. The outer diameter of this section at a point about four inches from its small diameter end would be in the order of .61 inch. This section would be of a length in the order of 52 inches, and at a point 48 inches from its smallest end would have an inner diameter in the order of .6708 inch and an outer diameter in the order of .7508 inch. At the very end of the large section, the inner diameter of the section could be .6836 inch and the outer diameter could be .7636 inch. The butt section, assuming a length of 52 inches, would have an inner diameter at its smallest end of .7508 inch and an outer diameter of .8308 inch. The outer diameter four inches from its smallest end would be in the order of .8436 inch. At its opposite end, the butt section would have an inner diameter in the order of .9172 inch and an outer diameter in the order of .9972 inch. A rod constructed as per the dimensions quoted would have an overall length, when extended, of slightly more than 16 feet, with its maximum diameter one inch and the minimum outer or tip diameter slightly less than one-eighth inch. Such a rod would have four inch overlap of the sections, when extended, and will be of sufficient strength and rigidity for its use as a fishing rod.

A rod of the proportions or dimensions quoted is understood to be illustrative, and variations from these dimensions may occur within a substantially wide range without sacrifice of the benefits and advantages of the construction.

A rod of the dimensions above quoted is characterised by a very slight deflection or bending when extended to its full 16 foot length. By actual measurement a deflection of about 15 inches occurs, due to the weight of the unit. Thus, when the large diameter or butt end section of a rod was supported flat upon a horizontal surface 29 inches above floor level, the very tip of the rod section was at a height of 14 inches above floor level. The rod is capable of bending to a greater extent incident to usage, as when playing a fish, and at this time possesses all of the properties of flexibility which are desirable in a fishing pole or rod. Another desirable characteristic of the device is that it possesses resilience and returns to its normal shape after flexure, and in otherwords will avoid taking a set or being permanently bent.

Another interesting characteristic of the construction is that the parts will move relative to each other to fully extended position by a very smooth movement. Thus, when the rod is fully collapsed, it can be held in horizontal position and swung forwardly, that is, endwise in the direction of its small diameter end, and suddenly stopped. Such a movement will be sufficient to cause each of the smaller sections to be projected to extended position without requiring their individual manipulation. After such projection, a slight pull upon each individual joint, for the purpose of setting it at frictional interlocking and supporting position, is all that is required to condition the rod for use. When the rod is to be collapsed, the friction fit of the sections can be released quickly and easily by grasping adjacent sections at the joint and applying a combined relative rotating and endwise movement between the parts. Once the friction joint between the parts has been separated, the parts will again move readily, one relative to another, to assume their fully collapsed or telescoped position.

The use of ferrules 16 is not essential but is preferred. Where employed, the ferrules serve to reinforce the outer or telescoping part at each wedged tapered joint to insure against splitting of that outer or telescoping member. The wall thickness of the ferrule, where employed, is less than the difference between the outer diameters of each rod section at their opposite ends in the preferred form. This arrangement thus permits the complete collapsing or telescoping of the rod sections so that the overall length of the rod, when collapsed, is substantially the length of one rod section only. The departure from this dimension will amount only to the projection or extension of each rod section from its receiving adjacent section by an amount equal to the spacing between the line guide and its small dimension end. The limited extent to which the telescoped sections project from their telescoping sections is illustrated in Fig. 2 in cases where the line guides 18 are mounted upon the forward or outer ends of the ferrule 16. The line guides 18 may be of any form found suitable and will preferably constitute rings of comparatively large diameter through which a line may be passed freely and without restriction, said rings being spaced from the ferrule in a lateral or radial direction and at a comparatively small distance. It will be understood, however, that line guides are not required and, instead, especially in cases where the tip section 14 of the rod is hollow, a line may be passed through the center of the rod or shaft. Where metal ferrules are used, of the character illustrated in Fig. 3, the tip of the ferrule may project at 22 beyond the end of the rod section upon which the same is mounted and be inwardly flanged at 22 so that its innermost surface will form a guide in conjunction with the inner surface of the rod section. This in effect serves to elongate the wedged fit between adjacent sections.

The butt member 20 is here illustrated as a rubber cup-shaped member which has a snug locking fit upon the large diameter or butt end of the butt section 10. Such construction is illustrative, and other forms made of metal or other material, which have either friction fit or screw-threaded fit, may be employed as desired.

A modified embodiment of the invention is illustrated in Fig. 4. This construction is characterized by the formation of the small end portion of a rod section 30 of substantially uniform wall thickness and uniform taper, with a portion 32 at its small diameter end which is of increased thickness and which is uniform as provided, for example, by a series of additional wraps of fiber cloth bonded to the wraps which make up the body portion 30 by the synthetic resin, and the entire unit preferably being formed in a single operation. In other words, the additional wraps which make up the part 32 will preferably be applied by wrapping the material around the mandrel on which the member 30 is formed before the curing operation for the part 30, so that the parts 30 and 32 will be cured simultaneously on the mandrel. The arrangement will be such that the portion 32 will extend for a substantial part of the length at which the parts interfit telescopically, that is, that portion 36 of the inner or telescoped member 34 which has a frictional fit with the member 30 will not greatly exceed the length of the reinforcing portion 32, or may be of the same length as the part 32. The part 32 will preferably extend to the end of the part 30, as illustrated. The part 32 serves as an integral reinforcement which renders the use of separate ferrules 16 unnecessary and is particularly well suited for constructions where the use of line guides is to be omitted or dispensed with. The outer diameter of the part 32 will preferably be less than the inner diameter at the small or tip end of the telescoping part within which it fits when the rod is telescoped or collapsed.

It is possible, by varying the wall thickness of a section along its length, as by employing more wraps at some parts of the rod section than at others, to control the action characteristics of the rod. Thus, if a greater flexibility of the rod is desired at one zone compared to another zone of the same section, the wall thickness may be made less at the flexible zone than at the other zone.

While the device is primarily intended to be used as a fishing pole, it may have other uses, and is intended for all uses to which it may be suited or adapted.

I claim:

1. A sectional telescopic rod adapted for use as a fishing rod comprising a plurality of telescopically interfitting elongated sections of circular cross-sectional shape, each telescoping section constituting a tube substantially uniformly tapered throughout its length, each of said sections being formed of multiple layers of woven fiber glass cloth bonded together and coated by molded synthetic resin, the taper of the outer surface of the large end portions of all telescoped tubes and of the outer surface of at least the large end of the smallest section being similar to the taper of the inner surfaces of the telescoping end portions of the cooperating tubes, the outer dimensions of the large ends of the telescoped parts being precisely predetermined and slightly larger than the precisely predetermined inner dimensions of the respective cooperating small ends of the telescoping parts, the inner and outer surfaces being smooth whereby said sections may be longitudinally slidably extended into substantially continuous circumferential and longitudinal frictional engagement for portions thereof greater in length than the transverse dimensions of said sections and constituting only small fractions of the lengths of said sections to hold said sections in coaxial relation in a manner to sustain flexing of the rod by stresses applied transversely thereto and to accommodate return of said rod to normal shape after flexing, and a closure mounted on and spanning the large end of the outermost section.

2. A sectional telescopic rod as defined in claim 1, and ferrules mounted on and encircling the small end portions of said telescoping sections.

3. A sectional telescopic rod as defined in claim 1, wherein the small end portions of said telescoping sections are of greater wall thickness than the remainder of said sections and the inner surfaces of said telescoping sections are longitudinally continuously tapered.

4. A sectional telescopic rod adapted for use as a fishing rod comprising at least two telescopically interfitting elongated sections of circular cross-sectional shape, each telescoping section constituting a tube substantially uniformly tapered throughout its length, each of said sections being formed of multiple layers of woven fiber glass cloth bonded together and coated by molded synthetic resin, the taper of the outer surface of the large end portions of all telescoped tubes being similar to the taper of the inner surfaces of the telescoping end portions of the cooperating tubes, the outer dimensions of the large ends of the telescoped parts being predetermined and slightly larger than the predetermined inner dimensions of the respective cooperating small ends of the telescoping parts, the inner and outer surfaces being smooth whereby said sections may be longitudinally slidably extended into substantially continuous circumferential and longitudinal frictional engagement for portions thereof greater in length than the transverse dimensions of said sections and constituting only small portions of the lengths of said sections to hold said sections in coaxial relation in a manner to sustain flexing of the rod by stresses applied transversely thereto and to accommodate return of said rod to normal shape after flexing, and a closure mounted on and spanning the large end of the outermost section.

5. A sectional telescopic rod adapted for use as a fishing rod comprising at least two telescopically interfitting elongated sections of circular cross-sectional shape, each telescoping section constituting a tube substantially uniformly tapered throughout its length, each of said sections being formed of glass fibers bonded together and coated by molded synthetic resin, the taper of the outer surface of the large end portions of all telescoped tubes being similar to the taper of the inner surfaces of the telescoping end portions of the cooperating tubes, the outer dimensions of the large ends of the telescoped parts being predetermined and slightly larger than the predetermined inner dimensions of the respective cooperating small ends of the telescoping parts, the inner and outer surfaces being smooth whereby said sections may be longitudinally slidably extended into substantially continuous circumferential and longitudinal frictional engagement for portions thereof greater in length than the transverse dimensions of said sections and constituting only small portions of the lengths of said sections to hold said sections in coaxial relation in a manner to sustain flexing of the rod by stresses applied transversely thereto and to accommodate return of said rod to normal shape after flexing, and a closure mounted on and spanning the large end of the outermost section, the taper of the frictionally engaging portions being approximately .003 inch per inch of length.

References Cited in the file of this patent

UNITED STATES PATENTS

| | | |
|---|---|---|
| 21,955 | Grosholz | Nov. 2, 1858 |
| 1,264,040 | Fackler | Apr. 23, 1918 |
| 1,603,876 | Shapard | Oct. 19, 1926 |
| 1,870,976 | Welch | Aug. 9, 1932 |
| 2,319,992 | Hubbard | May 25, 1943 |
| 2,438,434 | Friedman | Mar. 23, 1948 |
| 2,467,999 | Stephens | Apr. 19, 1949 |
| 2,528,706 | Osborn | Nov. 7, 1950 |
| 2,571,692 | Dubois | Oct. 16, 1951 |
| 2,594,693 | Smith | Apr. 29, 1952 |
| 2,594,838 | Alexander | Apr. 29, 1952 |
| 2,602,766 | Francis | July 8, 1952 |
| 2,606,574 | Lefebvre | Aug. 12, 1952 |

FOREIGN PATENTS

| | | |
|---|---|---|
| 205 | Great Britain | of 1883 |
| 418,616 | France | of 1910 |